Figure 1:
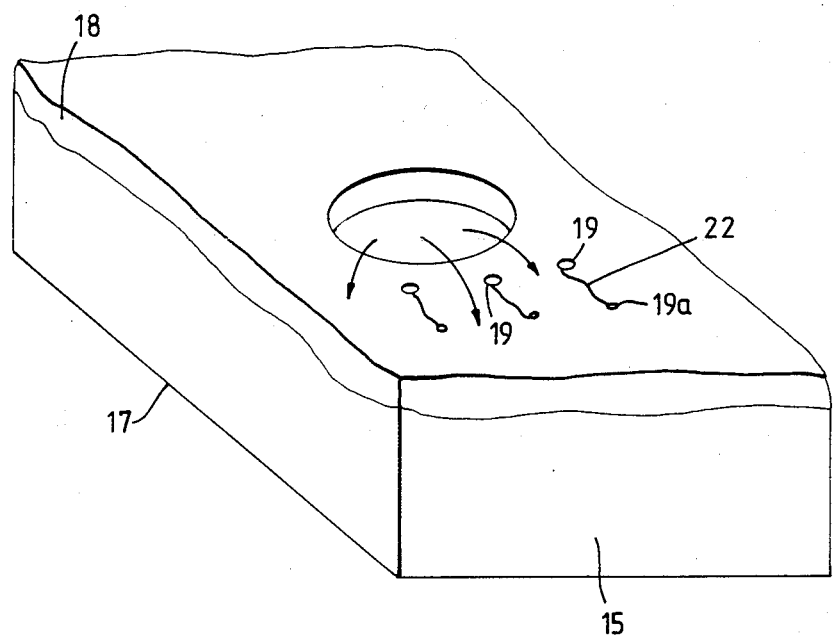

United States Patent [19]

Watson

[11] Patent Number: 4,915,975
[45] Date of Patent: Apr. 10, 1990

[54] METHOD OF FLUID FLOW VISUALIZATION

[75] Inventor: Hugh M. L. Watson, Derby, England

[73] Assignee: Rolls-Royce plc, London, England

[21] Appl. No.: 238,245

[22] Filed: Aug. 30, 1988

[30] Foreign Application Priority Data

Oct. 7, 1987 [GB] United Kingdom ............... 8723544

[51] Int. Cl.[4] .............................................. B05D 3/00
[52] U.S. Cl. ......................................... 427/8; 73/861;
116/201; 116/273; 116/264; 427/202; 427/262
[58] Field of Search ........................... 427/8, 202, 262;
116/201, 273, 264; 73/861

[56] References Cited

U.S. PATENT DOCUMENTS 4,423,626 1/1984 Herschede ................... 116/273 X

Primary Examiner—Shrive Beck
Attorney, Agent, or Firm—Cushman, Darby & Cushman

[57] ABSTRACT

A method of flow visualization comprises the steps of coating the surface of a component in a pigmented oil-based paint of non-gelling characteristics, applying dry dye particles, which are soluble in the oil based paint to the surface of the coating and passing a fluid flow over the component.

The fluid flow causes the dye particles to translate across the coating so that regions of the particles that are in contact with the coating dissolve to leave trails on the surface of the coating which are indicative of the relative strengths of the fluid flows acting on the surfaces of the component.

5 Claims, 1 Drawing Sheet

METHOD OF FLUID FLOW VISUALIZATION

This invention relates to a method for the visualization of fluid flows over the surfaces of solid components.

It is known to apply a coating, with non-geling characteristics, to a surface of a component which on the subsequent passage of a fluid flow thereover will move to produce a visible pattern of streaks in the coated surface. The pattern generated in th coating enables visualization of the fluid flow direction across the component surfaces.

In German Patent No. 2659693, a component surface is coated with a wet solution of Manganese chloride ($Mncl_2$) and Hydrogen Peroxide ($H_2O_2$). Ammonia ($NH_3$) or methylamine is introduced into an airstream and passed over the surface. Due to local diffusion and absorption effects, colourisation reactions occur on the coated surface of the component to give an immediate visual indication of the fluid flow over the component surface by way of the varying colour intensity.

Disadvantages of this known method of flow visualization are that:

(a) a gas has to be introduced into the airstream at a controlled rate to ensure that its concentration is uniform throughout the airstream, (b) the introduction of a gas into the airstream may limit the applications of this technique and possibly adversely affect the environment in which the test is to be conducted, (c) the method is indicated by a positive result of colourisation and therefore failure to introduce the ammonia leads to lack of colourisation effects which unless monitored will be interpreted as a lack of fluid flow distribution about certain features.

The present invention seeks to provide an improved method of fluid flow visualization over the surfaces of solid components.

According to the present invention a method of fluid flow visualization comprises the steps of coating a component with a pigmented oil based paint of non-geling characteristics, applying dry dye particles which are soluble in the oil based paint to the surface of the coating and passing a fluid flow over the component, whereby the fluid flow causes the dye particles to translate across the coating dissolving to leave trails on the surface of the coating which trails enables visualization of the passage of the fluid flow over the surface of the component.

Preferably the pigmented oil based paint, comprises a solid solution of a fluorescent pigment in a melamine formaldehyde sulphonamide resin suspended in a mineral oil.

The pigmented oil based paint preferably includes a wetting agent such as Linoleic Acid.

The dry dye particles applied to the coating of pigmented oil based paint are preferably of a contrasting phthalocyanine dye.

FIG. 1 is representative of a surface treated by the disclosed fluid flow visualization method.

The invention will now be described by way of example and with reference to the accompanying drawing.

Referring to the drawing a surface 15 of a solid component 17 is coated with a pigmented oil based paint 18 of non-geling characteristics, and with a viscosity chosen such that the paint coating will not move under gravity.

The following formulation attains a pigmented oil based paint of non-geling characteristics and with the necessary viscosity: 120 grammes of a solid solution of a fluorescent pigment in a melamine formaldehyde sulphonamide resin mixed with 234 grammes of a mineral oil.

The preferred pigment is produced by Sterling Industrial colours Limited and is marketed under the trade name Flare 610 series (Yellow 7).

The mineral oil, is that marketed under the trade name Mobil Jet II Oil.

Optionally 10 grammes of a wetting agent such as Linolic Acid is introduced to ensure cohesion of the pigmented oil based paint to the surface 15 of the solid component 17.

Particles of a dry phthalocyanine dye 19 are then uniformly sprinkled onto the coating of the oil based paint 18 using a dry brush or an industrial air blower depending on the accessibility of the surfaces under test.

A flow of air 20 is then passed over the solid component 17 and this causes the dye particles 19 to translate across the coating of the oil-based paint 18. The dye particles 19 move to new positions, as shown for clarity by the single dye particle at 19a, under the influence of the air flow. The regions of the dye particles that come into contact with the coating of the oil-based paint dissolve in the oil as they are translated to leave a trail 22 on the surface of the coating. This results in a reduction in the size of the particles, as shown at 19a due to their dissolution.

Preferably a contrasting phthalocyanine dye is sprinkled onto the coating of the oil-based paint so that movement of the particles 19 under the influence of an air flow produces a pattern of contrasting trails on the surface of the coating which permanently records and highlights the fluid flow distribution pattern for visualization.

Comparison of the relative movements of the dye particles 19, provides an indication of the relative strengths of the fluid flows acting on the surfaces of the component under test.

The method of flow visualization described and illustrated herein has the advantage that by utilizing phthalocyanine dye which is soluble in the oil, the subsequent movement of these particles under the influence of a gaseous flow causes trails which highlight and permanently record the gaseous flow distribution pattern for visualization. Techniques used previously relied on streaks appearing in the actual coating on application of an air flow.

Further advantages are that there is no necessity for the introduction of a gas into the air flow with the effect that this method will not adversely affect the test environment. It thereby removes the necessity for monitoring the gas concentration introduced into the air flow leading to reductions in both time and expenditure during testing.

I claim:

1. A method of fluid flow visualization comprising the steps of,
    coating a surface of a component with a pigmented oil based paint of non-geling characteristics,
    applying to the surface coated with the oil based paint dry dye particles which are soluble in the oil based paint,
    passing a fluid flow over the component whereby the fluid flow causes the dry dye particles to translate across the surface coated with the oil based paint, the dye particles dissolving in the oil based paint as they translate across the coated surface to leave trails in the oil based paint, said trails in the oil based paint enabling visualization of the passage of the fluid flow over the surface of the component.

2. A method of fluid flow visualization as claimed in claim 1 in which the pigmented oil based paint, comprises a solid solution of fluorescent pigment in a melamine formaldehyde sulphonamide resin suspended in a mineral oil.

3. A method of fluid flow visualization as claimed in claim 1 in which the pigmented oil based paint includes a wetting agent.

4. A method of fluid flow visualization as claimed in claim 3 in which the wetting agent is Linoleic Acid.

5. A method of fluid flow visualization as claimed in claim 1 in which the dye is a contrasting phthalocyanine dye.

* * * * *